(12) United States Patent
Burch et al.

(10) Patent No.: US 6,875,246 B2
(45) Date of Patent: *Apr. 5, 2005

(54) WATER VAPOR TRANSFER DEVICE FOR FUEL CELL REFORMER

(75) Inventors: Steven Burch, Honeoye Falls, NY (US); Jameson R. Forte, Rochester, NY (US); Mark A. Brundage, Pittsford, NY (US)

(73) Assignee: General Motors Corporation, Detroit, MI (US)

(*) Notice: Subject to any disclaimer, the term of this patent is extended or adjusted under 35 U.S.C. 154(b) by 742 days.

This patent is subject to a terminal disclaimer.

(21) Appl. No.: 09/910,307

(22) Filed: Jul. 20, 2001

(65) Prior Publication Data

US 2003/0014918 A1 Jan. 23, 2003

(51) Int. Cl.⁷ ............................ H01M 8/04; C01B 3/32; B01J 8/02
(52) U.S. Cl. ................. 48/61; 48/127; 48/128; 48/78; 422/177; 429/19; 429/34
(58) Field of Search .................. 422/177; 48/61, 48/127, 128, 78; 429/19, 34

(56) References Cited

U.S. PATENT DOCUMENTS

| | | |
|---|---|---|
| 3,134,697 A | 5/1964 | Niedrach |
| 4,650,722 A | 3/1987 | Brown |
| 4,927,857 A | 5/1990 | McShea, III et al. |
| 5,272,017 A | 12/1993 | Swathirajan |
| 5,316,871 A | 5/1994 | Swathirajan |
| 5,478,662 A | 12/1995 | Strasser |
| 5,543,238 A | 8/1996 | Strasser |
| 5,763,113 A | 6/1998 | Meltser et al. |
| 5,993,619 A | 11/1999 | Bloomfield et al. |
| 6,007,931 A | 12/1999 | Fuller |
| 6,013,385 A | 1/2000 | DuBose |
| 6,048,472 A | 4/2000 | Nataraj et al. |
| 6,077,620 A | 6/2000 | Pettit |
| 6,099,484 A | 8/2000 | Douglas |
| 6,132,689 A | 10/2000 | Skala |
| 6,159,626 A | 12/2000 | Keskula |
| 6,485,854 B1 * | 11/2002 | Grover et al. ........... 429/17 |
| 6,579,637 B1 * | 6/2003 | Savage et al. .......... 429/12 |
| 2002/0031695 A1 * | 3/2002 | Smolkn ............... 429/30 |
| 2003/0019363 A1 * | 1/2003 | Grover ............... 96/189 |
| 2003/0138680 A1 * | 7/2003 | Goetel et al. .......... 429/20 |
| 2004/0179998 A1 * | 9/2004 | Gittleman et al. ...... 423/650 |

FOREIGN PATENT DOCUMENTS

| | | |
|---|---|---|
| DE | 42 01 632 A1 | 7/1993 |
| EP | 0 977 293 A2 | 2/2000 |
| EP | 1 066 876 A1 | 1/2001 |

OTHER PUBLICATIONS

International Search Report PCT/US02/21762 mailed Oct. 3, 2002.

* cited by examiner

*Primary Examiner*—N. Bhat
(74) *Attorney, Agent, or Firm*—Harness, Dickey & Pierce, P.L.C.

(57) ABSTRACT

A hydrocarbon fuel reformer that is supplied with water vapor extracted from the reformer's effluent stream. In particular, the present invention provides a power plant fuel processor for the production of hydrogen from a hydrocarbon fuel, comprising:

(a) a reactor for the production of hydrogen using an oxidant, water and hydrocarbon fuel; and
(b) a water transfer device that transfers water vapor from the reformate produced by said reactor to the oxidant used by said reactor, comprising a water-transfer membrane.

24 Claims, 4 Drawing Sheets

WATER VAPOR TRANSFER DEVICE FOR FUEL CELL REFORMER

BACKGROUND OF THE INVENTION

This invention relates to reformers for the production of hydrogen from hydrocarbon fuel. Such reformers may be used to produce hydrogen for fuel cells in a power plant. In particular, this invention relates to reformers having a device that transfers water vapor from the hydrogen-containing reformate produced by the reformer back to the fuel/air input for the reformer.

Fuel cells are devices that convert electrochemical energy from the reaction of reducing and oxidizing chemicals, into electricity. Fuel cells have been used as a power source in many applications, and can offer significant benefits over other sources of electrical energy, such as improved efficiency, reliability, durability, cost and environmental benefits. In particular, electric motors powered by fuel cells have been proposed for use in cars and other vehicles to replace internal combustion engines.

Fuel cells typically use hydrogen and air as the reducing and oxidizing materials to produce electrical energy, and water. The cell generally comprises an anode electrode and a cathode electrode separated by an electrolyte. Hydrogen is supplied to the anode electrode, and oxygen (or air) is supplied to the cathode electrode. The hydrogen gas is separated into electrons and hydrogen ions (protons) at the anode. The hydrogen ions pass through the electrolyte to the cathode; the electrons travel to the cathode through the power circuit (e.g., to a motor). At the cathode, the hydrogen ions, electrons, and oxygen then combine to form water. The reactions at the anode and cathode are facilitated by a catalyst, typically platinum.

The anode and cathode of the fuel cell are separated by an electrolyte. There are several types of fuel cells, each incorporating a different electrolyte system, and each having advantages that may make them particularly suited to given commercial applications. One type is the proton exchange membrane (PEM) fuel cell, which employs a thin polymer membrane that is permeable to protons but not electrons. PEM fuel cells, in particular, are well suited for use in vehicles, because they can provide high power and weigh less than other fuel cell systems.

The membrane in the PEM fuel cell is part of a membrane electrode assembly (MEA) having the anode on one face of the membrane, and the cathode on the opposite face. The membrane is typically made from an ion exchange resin such as a perfluoronated sulfonic acid. The MEA is sandwiched between a pair of electrically conductive elements that serve as current collectors for the anode and cathode, and contain appropriate channels and/or openings for distribution of the fuel cell's gaseous reactants over the surfaces of the respective anode and cathode catalysts.

The anode and cathode typically comprise finely divided catalytic particles, supported on carbon particles, and admixed with a proton conductive resin. The catalytic particles are typically precious metal particles, such as platinum. Such MEAs are, accordingly, relatively expensive to manufacture and require controlled operating conditions in order to prevent degradation of the membrane and catalysts. These conditions include proper water management and humidification, and control of catalyst fouling constituents, such as carbon monoxide. Typical PEM fuel cells and MEAs are described in U.S. Pat. No. 5,272,017, Swathirajan et al., issued Dec. 21, 1993, and U.S. Pat. No. 5,316,871, Swathirajan et al., issued May 31, 1994.

The voltage from an individual cell is only about 1 volt. Accordingly, to meet the higher power requirements of vehicles and other commercial applications, several cells are combined in series. This combination is typically arranged in a "stack" surrounded by an electrically insulating frame that has passages for directing the flow of the hydrogen and oxygen (air) reactants, and the water effluent. Because the reaction of oxygen and hydrogen also produces heat, the fuel cell stack must also be cooled. Arrangements of multiple cells in a stack are described in U.S. Pat. No. 5,763,113, Meltser et al., issued Jun. 9, 1998; and U.S. Pat. No. 6,099,484, Rock, issued Aug. 8, 2000.

For many applications, it is desirable to use a readily available hydrocarbon fuel, such as methane (natural gas), methanol, gasoline, or diesel fuel, as the source of hydrogen for the fuel cell. Such fuels are relatively easy to store, and there is an existing commercial infrastructure for their supply. Liquid fuels such as gasoline are particularly suited for vehicular application. However, hydrocarbon fuels must be dissociated to release hydrogen gas for fueling the fuel cell. Power plant fuel processors for providing hydrogen contain one or more reactors or "reformers" wherein the fuel reacts with steam, and sometimes air, to yield reaction products comprising primarily hydrogen and carbon dioxide.

In general, there are two types of reforming systems: steam reformers, and autothermal reformers. Each system has operating characteristics that make it more or less suited to the use of particular types of fuels and in particular applications. In steam reformation, a hydrocarbon fuel (typically methane or methanol) and water (as steam) are reacted to generate hydrogen and carbon dioxide. This reaction is endothermic, requiring the addition of heat. In preferred systems, this heat is provided by a combustor that burns hydrogen that remains unreacted after the reformate passes through the fuel cell stack.

In an autothermal reformation process, a hydrocarbon fuel (typically gasoline), steam and air are supplied to a primary reactor that performs two reactions. One is a partial oxidation reaction, where air reacts with the fuel exothermally, and the other is the endothermic steam reforming reaction (as in steam reformation). The heat from the exothermic reaction is used in the endothermic reaction, minimizing the need for an external heat source.

A by-product of the reaction, in both steam and autothermal reforming, is carbon monoxide. Unfortunately, carbon monoxide will degrade the operation of the fuel cell, particularly PEM fuel cells. Thus, reactors downstream of the primary reactor are required to lower the carbon monoxide concentration in the hydrogen-rich reformate to levels tolerable in the fuel cell stack. Downstream reactors may include a water/gas shift (WGS) reactor and a preferential oxidizer (PrOx) reactor. The WGS reactor catalytically converts carbon dioxide and water to hydrogen and carbon dioxide. The PrOx reactor selectively oxidizes carbon monoxide to produce carbon dioxide, using oxygen from air as an oxidant. Control of air feed to the PrOx reactor is important to selectively oxidize carbon monoxide, while minimizing the oxidation of hydrogen to water.

Fuel cell systems that dissociate a hydrocarbon fuel to produce a hydrogen-rich reformate for consumption by PEM fuel cells are well known in the art. Such systems are described in U.S. Pat. No. 6,077,620, Pettit, issued Jun. 20, 2000; European Patent Publication 977,293, Skala, et al., published Feb. 2, 2000; and U.S. Pat. No. 4,650,722, Vanderborgh, et al., issued Mar. 17, 1987.

The use of hydrocarbon reformate fuel cell systems in cars and other vehicles presents special concerns. In addition to the desirability of using readily-available liquid fuels, discussed above, the reformer and fuel cell systems must be relatively light in weight, and must be able to operate efficiently under a wide range of ambient conditions (e.g., under a range of temperatures and humidity conditions). They should also be able to be started quickly, so as to produce power within a short time interval after start-up of the vehicle. Thus, it is desirable to minimize the amount of heating of reactant components for the reformer. It is also desirable to minimize the amount of liquid water that must be handled in the system, particularly to avoid the need to replenish water within the system.

As discussed above, there are several components in the reformate fuel cell system that require water, particularly including the reformer that requires steam as a reactant, the WGS reactor, and the fuel cell that requires humidification of the MEA in order to function properly. A common approach to enhancing water balance in fuel cell systems is use of condensing heat exchangers at various points in the system. For example, heat exchangers are used downstream of the reformer to cool the reformate exhaust to a temperature at or below its dew point so as to precipitate water. The water is separated from the gaseous reformate, and stored in a reservoir. The water is then returned to the reformer where it is heated to create steam. Heat exchangers are also used to cool the exhaust stream exiting the cathode of the fuel cell so as to condense water which is used in humidifying the MEA. The use of heat exchangers presents issues, however. For example, the water recovery efficiency of heat exchangers is reduced as the ambient temperature increases. Large radiators may be required so as to dissipate the heat of condensation. Moreover, the liquid condensate produced by the heat exchangers must be vaporized for re-use in the system, creating an additional energy load and inefficiencies in the system.

Attempts to address the water balance needs in fuel cell systems have been described in the art. See, for example, German Patent Disclosure 42 01632, Strasser, published Jul. 29, 1993; U.S. Pat. No. 6,007,931, Fuller et al., issued Dec. 28, 1999; and U.S. Pat. No. 6,013,385, DuBose, issued Jan. 11, 2000. However, water management systems among those known in the art do not adequately address these needs, due to problems such as their inability to maintain true water balance over a wide range of operating conditions, mechanical complexity and reliability, increased system energy requirements, and potential safety issues.

SUMMARY OF THE INVENTION

The present invention provides a hydrocarbon fuel reformer that is supplied with water vapor extracted from the reformer's effluent stream. Accordingly, the present invention provides a power plant fuel processor for the production of hydrogen from a hydrocarbon fuel, comprising:

(a) a reactor for the production of hydrogen using an oxidant, water and hydrocarbon fuel; and (b) a water transfer device that transfers water vapor from the reformate produced by said reactor to the oxidant used by said reactor, comprising a water-transfer membrane.

It has been found that such water transfer devices afford significant advantages over water management systems known in the art. In particular, such systems afford advantages maintaining an overall water balance in the system under a range of operating conditions, reduced energy requirements, reduced component complexity and reliability, and enhanced operating safety.

DETAILED DESCRIPTION

The present invention provides a hydrocarbon fuel processor. As referred to herein, a "hydrocarbon fuel processor" comprises any device that converts a hydrocarbon fuel into hydrogen, preferably for use with a fuel cell. As referred to herein, a "fuel cell" may be a single cell for the electrochemical creation of electricity, preferably a PEM fuel cell using hydrogen and an oxidant, or a plurality of cells in a stack or other configuration that allows series connection of the cells so as to produce increased voltage. As referred to herein, a "hydrocarbon fuel cell plant" is an apparatus that comprises a fuel cell and a hydrocarbon fuel processor for providing hydrogen for the fuel cell. In a preferred embodiment, the hydrocarbon fuel cell plant is suitable for use in a motor vehicle. In another preferred embodiment, the hydrocarbon fuel cell plant is suitable for use in a stationary apparatus, such as an emergency or supplemental power generator for home or commercial use.

Preferably, the hydrocarbon fuel processor converts hydrocarbon fuel, using an oxidant and water, to create a stream of hydrogen gas. Preferably, the hydrocarbon fuel is any fuel capable of being reformed to produce hydrogen, including gasoline, diesel fuel, natural gas, methane, butane, propane, methanol, ethanol, or mixtures thereof. (As used herein, the word "include" (and its variants) is intended to be non-limiting, such that recitation of items in a list is not to the exclusion of other like items that may also be useful in the apparatuses, devices, components, materials, compositions and methods of this invention.)

Figure 1:
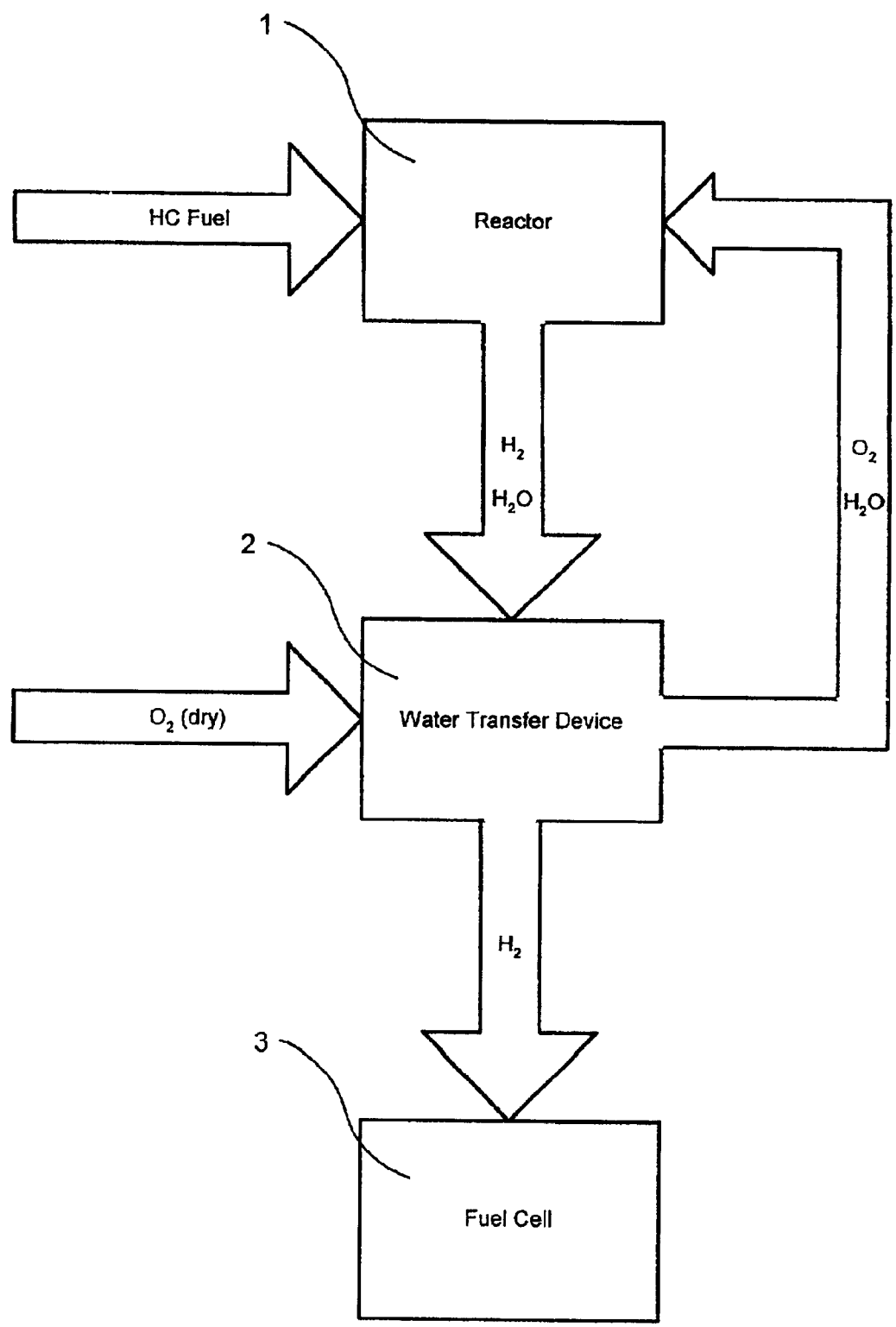
FIG. 1 is a diagram depicting a hydrocarbon fuel processor of this invention connected to a fuel cell and showing the flow of materials in and out of the reactor and water transfer device.

In particular, as depicted in FIG. 1, the present invention provides a power plant fuel processor comprising a reactor (1) and a water transfer device (2) that transfers water vapor from the reformate produced by the reactor to the input of the reactor. As referred to herein, "reformate" is the gaseous product or effluent comprising hydrogen that is produced by a reactor from a hydrocarbon fuel. In one embodiment, the reformate from the reactor, after passing through the water transfer device, flows to a fuel cell (3). Also in this embodiment, the water vapor is transferred to the reactor as part of the oxidant stream. The transfer may be directly to the input of the reactor or to a device, such as an air moving device, which in turn is connected to the input of the reactor. The water transfer device preferably comprises a water-transfer membrane. Reactor:

The apparatus of the present invention comprises a reactor that is capable of converting a hydrocarbon fuel to hydrogen for use in a fuel cell. Preferred reactors include steam reforming reactors and autothermal reactors as generally described in the background, above. Among such reactors useful in this invention are those known in the art, such as described in the following documents, all of which are incorporated by reference herein: U.S. Pat. No. 4,650,722, Vanderborgh, et al., issued Mar. 17, 1987; U.S. Pat. No. 6,077,620, Pettit, issued Jun. 20, 2000; and U.S. Pat. No. 6,132,689, Skala et al., issued Sep. 22, 1998; U.S. Pat. No. 6,159,626, Keskula et al., issued Jul. 6, 1999; European Patent Publication 977,293, Skala, et al., published Feb. 2, 2000; and European Patent Publication 1,066,876, Keskula et al., published Jan. 10, 2001.

Figure 2:
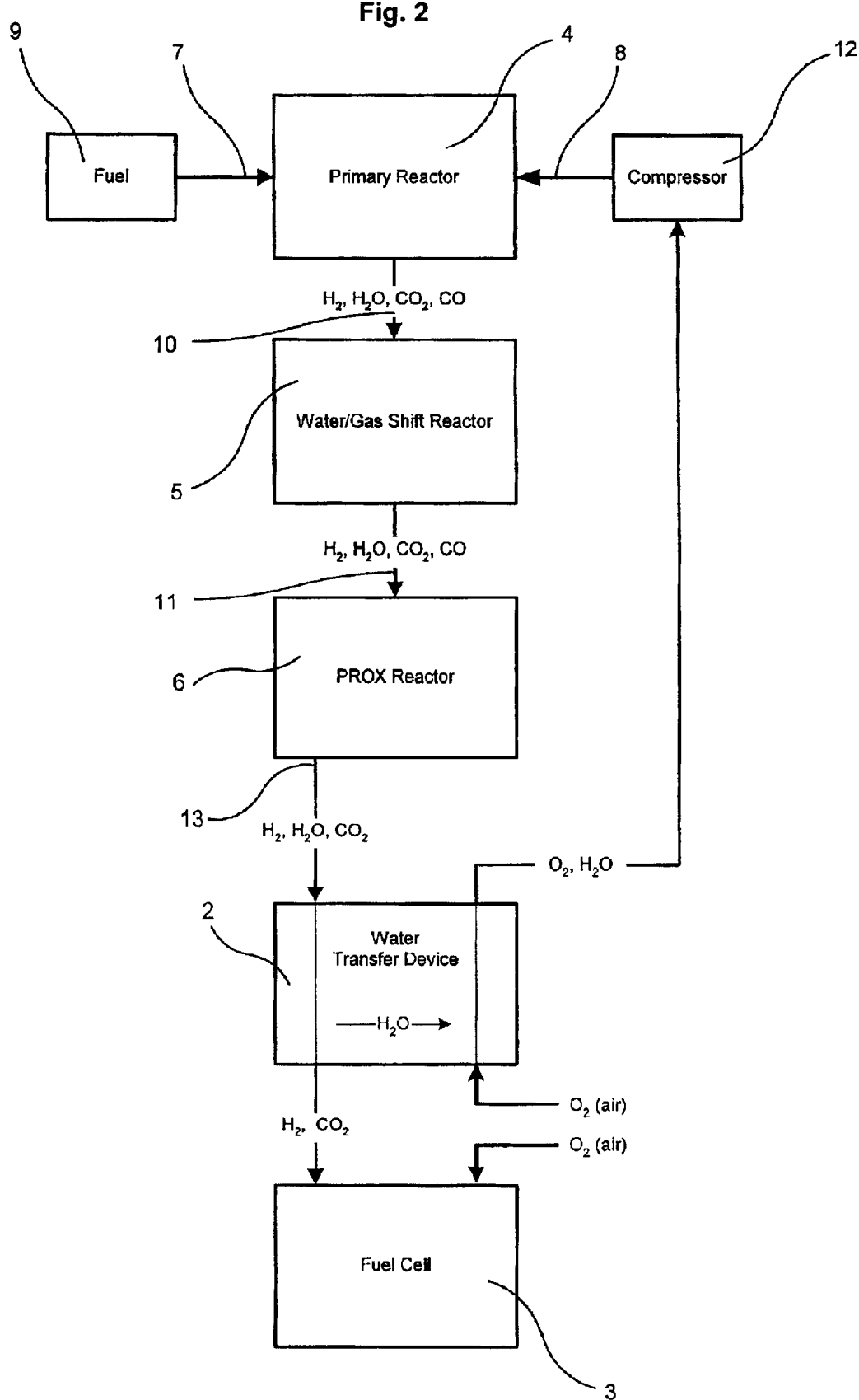
FIG. 2 is a diagram of a preferred embodiment of this invention, comprising a primary reactor, a water/gas shift (WGS) reactor, and a preferential oxidizer (PrOx) reactor.

In one embodiment of this invention, as generally depicted in FIG. 2, the reactor comprises one or more reactors (4, 5, 6). Hydrocarbon fuel (stream 7) undergoes dissociation in the presence of water/steam to produce the reformate. In one such specific embodiment, air is used in a combination partial oxidation/steam reforming reaction. In this case, the reactors (4 and 6) also receive an air stream (8). Each reactor (4, 5, 6) may comprise one or more sections or reactor beds. A variety of designs are known and usable. Therefore, the selection and arrangement of reactors (4, 5, 6) may vary; exemplary fuel reformation reactor(s) (4) and downstream reactor(s) (5, 6) are further described below.

A fuel tank (9) preferably stores the hydrocarbon fuel at ambient temperature. The fuel is then supplied (stream 7) to the fuel processor. In some embodiments, preferably with steam reforming reactors, the fuel is vaporized prior to entering the primary reactor (4).

In an exemplary autothermal reformation process, gasoline, water (as steam), and oxygen (air) are reacted in a primary reactor (4) to generate hydrogen and carbon dioxide as described earlier in the background. The reactor (4) comprises two sections. One section of the reactor is primarily a partial oxidation reactor (POX) and the other section of the reactor is primarily a steam reformer (SR), although there is some overlap in the type of reactions occurring in the POX and SR sections. The POX reaction is predominantly between fuel and air, having the following general reaction scheme.

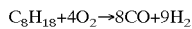

$$C_8H_{18}+4O_2 \rightarrow 8CO+9H_2$$

This reaction is facilitated by use of a catalyst and is exothermic. A preferred POX catalyst comprises one or more noble metals, Pt, Rh, Pd, Ir, Os, Au, and Ru. Other non-noble metals, or combination of metals, such as Ni and Co, are also useable. The reaction in the POX section is preferably fuel-rich. The hot POX reaction products, along with steam introduced with the fuel, pass into the SR section where the hydrocarbons react with steam according to the following general reaction scheme.

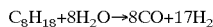

$$C_8H_{18}+8H_2O \rightarrow 8CO+17H_2$$

The steam reforming reaction is endothermic. Heat required for this endothermic reaction is provided from the heat that is generated by the exothermic POX reaction and is carried forward into the SR section by the POX section effluent (thus, the name "autothermal reactor").

The primary reformate products (10) from the primary reactor exit the primary reactor (4) and, in one embodiment, are cooled by a heat exchanger that transfers heat from the reformate to the air supplied to the primary reactor. In another embodiment, this heat transfer is effected by a water transfer device, without the need for a separate heat exchanger. Hydrogen is produced, but the gasoline reformation also produces carbon dioxide, water and carbon monoxide. Carbon monoxide, in particular, may have a detrimental effect on the catalyst used in the fuel cell stack. Accordingly, it is preferable to reduce the carbon monoxide content of the product stream.

Preferably, then, the fuel processor also comprises one or more downstream reactors, such as water/gas shift (WGS) reactor (5) and preferential oxidizer (PrOx) reactor (6), that are used to convert carbon monoxide to carbon dioxide. Preferably, the carbon monoxide is reduced to acceptable levels, preferably below about 20 ppm.

The shift reactor (5) preferably includes one or more sections whose carbon monoxide and water are reacted according to the following general scheme.

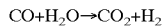

$$CO+H_2O \rightarrow CO_2+H_2$$

In one embodiment, there is provided a high temperature shift section and a low temperature shift section. In one such specific embodiment, the high temperature shift reactor comprises a $Fe_3O_4/Cr_2O_3$ catalyst, and runs at a temperature of from about 400° C. (752° F.) to about 550° C. (1022° F.). In the embodiment, the low temperature shift reactor comprises a $CuO/ZnO/Al_2O_3$ catalyst, and runs at a temperature of from about 200° C. (392° F.) to about 300° C. (572° F.). Preferably, cooling of the reformate stream occurs between the high temperature and the low temperature sections. In other embodiments, the WGS reactor contains a medium temperature shift reaction, running at a temperature of from about 300° C. (572° F.) to about 400° C. (752° F.), instead of, or in addition to, the high and low temperature reactors.

Reformate (11) exiting the shift reactor enters a preferential oxidation PrOx reactor (6) where it is catalytically reacted with oxygen through an air supply (8) according to the following general reaction scheme.

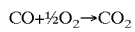

$$CO+\tfrac{1}{2}O_2 \rightarrow CO_2$$

This reaction is conducted to consume essentially all of, or at least most of, the residual carbon monoxide without consuming excess quantities of hydrogen.

An air stream (8) supplied to the fuel processor may be used in one or more of the reactors. For systems with an autothermal reformer, air is supplied to reactor (4). The PrOx reactor (6) also utilizes air to oxidize carbon monoxide to carbon dioxide, using a noble metal catalyst. Preferably air is supplied from an air moving device, preferably compressor (12). The air may be heated, using one or more heat exchanger(s), to the desired temperatures for the primary reactor (4). In such embodiments, the air for the primary reactor (4) is preferably supplied at a temperature of at least about 700° C. (1292° F.) depending on operating conditions.

In one embodiment, the PrOx hydrogen stream (13) exits the PrOx reactor (6) and is cooled by heat exchanger to a temperature suitable for use in a fuel cell (3). The hydrogen stream is preferably cooled to a temperature below about 100° C. (212° F.). The hydrogen stream (13) is then fed into the anode chamber of the fuel cell (3), via the water transfer device (2), as discussed below. At the same time, oxygen (e.g., air) from an oxidant stream (8) is fed into the cathode chamber of the fuel cell (3). Preferably, the air is compressed, using a compressor. The hydrogen from the reformate stream and the oxygen from the oxidant stream react in the fuel cell to produce electricity, in an electrochemical reaction in the presence of the catalyst. Water is produced as a by-product of the reaction. Exhaust or effluent (14) from the anode side of the fuel cell (3) contains some unreacted hydrogen. The exhaust or effluent (15) from the cathode side of the fuel cell (3) also contains some unreacted oxygen.

Some of the reactions that occur in the reactors (4, 5, 6) are endothermic and so require heat; other reactions are exothermic and require removal of heat. Typically, the PrOx reactor (6) requires removal of heat. Depending on the type of reformer, one or more of the reactions in the primary reactor (4) are endothermic and require heat be added. This is typically accomplished by preheating one or more of the fuel, water, and air reactants and/or, for a steam reforming reactor, by heating the selected reactors. The system preferably contains heat exchangers to transfer thermal energy from those parts of the system that generate heat, to those that require heat.

The fuel processor optionally preferably comprises a combustor, which may heat the fuel, air and/or water reactants entering the reactor. For fuel processors having a steam reforming reactor, the combustor preferably heats the reformer, directly or indirectly. In a preferred steam reforming system, the reactor beds are heated by the hot exhaust of the combustor. A preferred embodiment, comprising an autothermal reformer, does not have a combustor.

The combustor preferably comprises a chamber with an inlet, an exhaust, and a catalyst. Preferably, the source of fuel in the combustor is the unreacted hydrogen in the anode effluent. Additional fuel (stream 7) may be provided directly to the combustor, as needed to meet the transient and steady state needs of the fuel cell apparatus.

The hydrocarbon fuel and/or anode effluent are reacted in the catalyst section of the combustor. Oxygen is provided to the combustor either from the air supply and/or, preferably, the cathode effluent stream, depending on system operating conditions. Preferably, the exhaust from the combustor passes through a regulator and a muffler being released to the atmosphere. In systems where the reactor is heated by the combustor, enthalpy equations are used to determine the amount of cathode exhaust air to be supplied to the combustor so as to provide the heat needed by the reactors (4, 5). Any oxygen demand required by the combustor that is not met by the cathode effluent is preferably supplied by a compressor in an amount to satisfy the heat and temperature demanded by the combustor.

Water for the reactors is preferably provided by the water transfer device (2), as further discussed below. However, under certain situations (such as start-up of the system), additional water may be needed. This water is preferably obtained from the anode effluent and cathode effluent, such as using a condenser and a water separator. Liquid water is then stored in a reservoir. Water may also be added to the reservoir from external sources.

Preferably, the various aspects of the operation of the system are controlled using a suitable microprocessor, microcontroller, personal computer, etc., which has central processing unit capable of executing a control program and data stored in a memory. The controller may be a dedicated controller specific to any of the components, or implemented in software stored in a main vehicle electronic control module. Further, although software based control programs are usable for controlling system components in various modes of operation as described above, it will also be understood that the control can also be implemented in part or whole by dedicated electronic circuitry.

Water Transfer Device:

The present invention also provides a water transfer device that transfers water vapor from a wet gas stream to a dry gas stream. The water transfer devices of this invention comprise a structure comprising a flow path for a primary gas, a flow path for secondary gas, and a water transfer membrane having a first and second surface, wherein the first surface of the membrane is in substantial contact with the flow path for said primary gas, and the second surface is in substantial contact with the second flow path. Water vapor in a gas travelling in one flow path (e.g., the first flow path) is transferred through the membrane to the other flow path (e.g., the second flow path). A preferred water transfer device, for the transfer of water vapor between a primary gas and a secondary gas in a fuel cell power plant (one embodiment of which is depicted in a cross-sectional view in FIG. 3), comprises:

(a) a primary gas inlet (20);

(b) a primary gas outlet (21);

(c) a conduit (22) having an inner void (23) and outer surface (24), the walls of which comprise a water transfer membrane material, wherein one end of said conduit is connected to said primary gas inlet (20), and the other end of said conduit is connected to said primary gas outlet (21) so as to allow for the flow of a primary gas through said inner void; and (d) a housing (25) which encloses and provides a void space (26) around at least a portion of the outer surface of said conduit (22), wherein said housing has a secondary gas inlet (27) and a secondary gas outlet (28) allowing for the flow of a secondary gas through said void space (26); wherein secondary gas flowing through the void space of said housing passes over an outer surface of said conduit, but does not substantially mix with primary gas flowing through the inner void of said conduit.

The conduits may be any of a variety of shapes, including substantially cylindrical tubes, and three-dimensional rectangular passages. Preferably the water transfer device comprises a plurality of conduits (29), which are connected to a plenum (30) at the primary gas inlet and a plenum (31), at the primary gas outlet, so as to allow the flow of primary gas through all of the conduits. As used wherein, the term "connected" refers to any mechanism which allows the passage of fluid from one point to another, preferably without substantial loss of fluid. The device preferably also comprises a mechanism for supporting the conduits in the housing. Preferably the direction flow of the primary gas is in a substantially different, preferably essentially opposite, than the direction of flow of the secondary gas.

Figure 3:
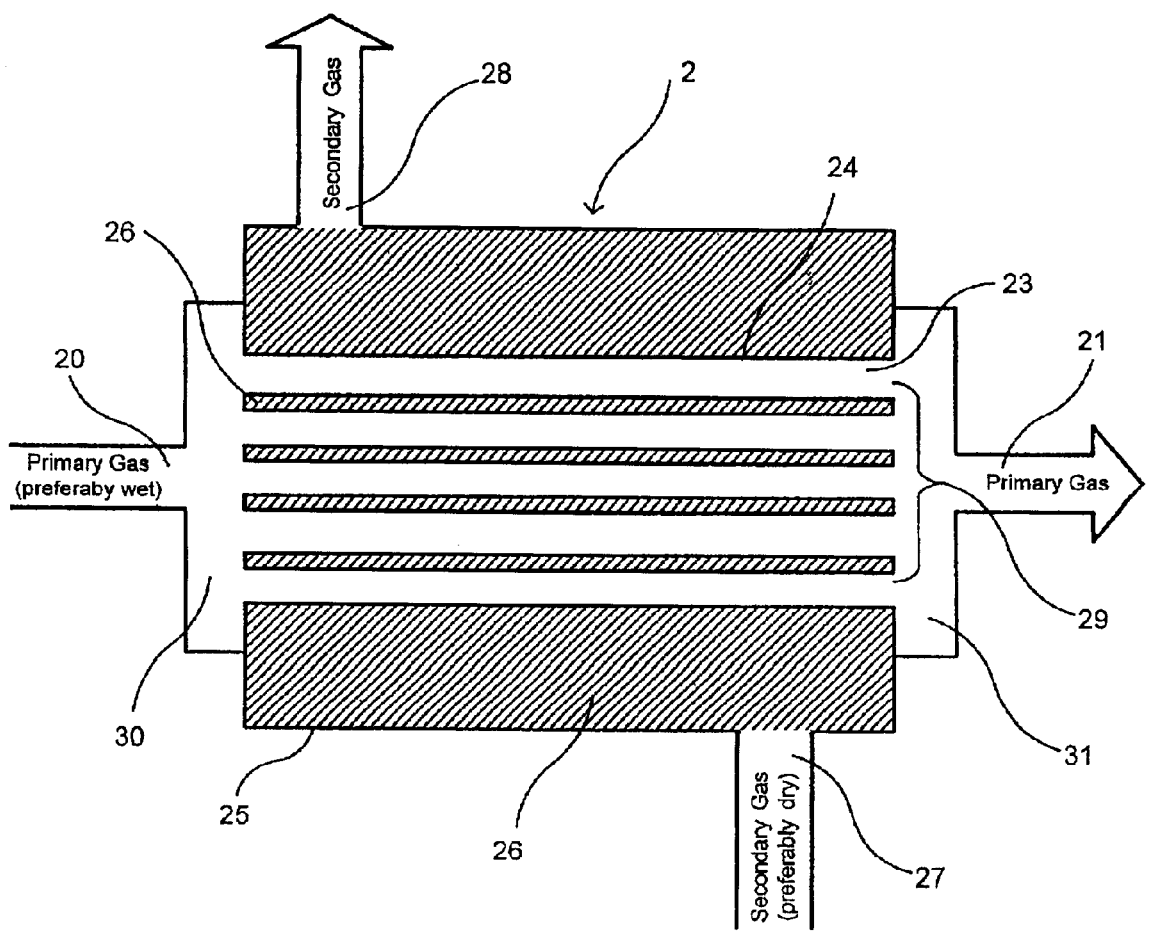
FIG. 3 depicts a cross sectional view of a water transfer device embodiment of this invention.

The water transfer membrane material useful herein is any material that allows the transfer of water vapor from one gas to another. Preferably, such material selectively allows the transfer of water vapor, without also allowing the transfer of other gasses. A preferred water transfer membrane selectively allows the transfer of water vapor from a stream of primary gas to a stream of secondary gas, without allowing significant passage (leaking) of other components from the primary gas stream to the secondary stream. Preferably, as depicted in FIG. 3, the primary gas is the wet gas stream, from which water vapor is transferred to the secondary gas, which is the dry gas stream. Preferably the primary gas is reformate and the secondary gas is air.

Preferred water transfer membrane materials useful herein include those made from poly[perfluorosulfonic] acid, sulfonated polystyrene, polyethersulfone, sulfonated polyetherketone, polycarbonates, other sulfonated materials, and mixtures thereof. A preferred membrane material is comprised of poly[perfluorosulfonic] acid. A particularly preferred membrane material is sold under the brand name "NAFION" by the E.I. DuPont de Nemours Company. Tubes useful herein made of NAFION membrane are and sold under the brand name "PD SERIES MOISTURE EXCHANGERS" by Perma Pure, Inc.

In a preferred embodiment of the invention, the primary gas is hydrogen reformate made by the reactor, containing water as a by-product of the reformate reactions. Accordingly, a preferred power plant hydrocarbon reformer of this invention comprises:

(a) a reactor having a reactant input, and a hydrogen product output; and (b) a water transfer device comprising (i) a transfer device input connected to said hydrogen product output of the reactor, (ii) a transfer device output connected to said reactant input of the reactor, and (iii) a water-transfer membrane; wherein said water transfer device transfers water from said hydrogen product output to said reactant input. A preferred method of this invention comprises the transfer of water vapor from the reformate made by a reactor to a reactant using a water vapor transfer device comprising a water transfer membrane.

Figure 4:
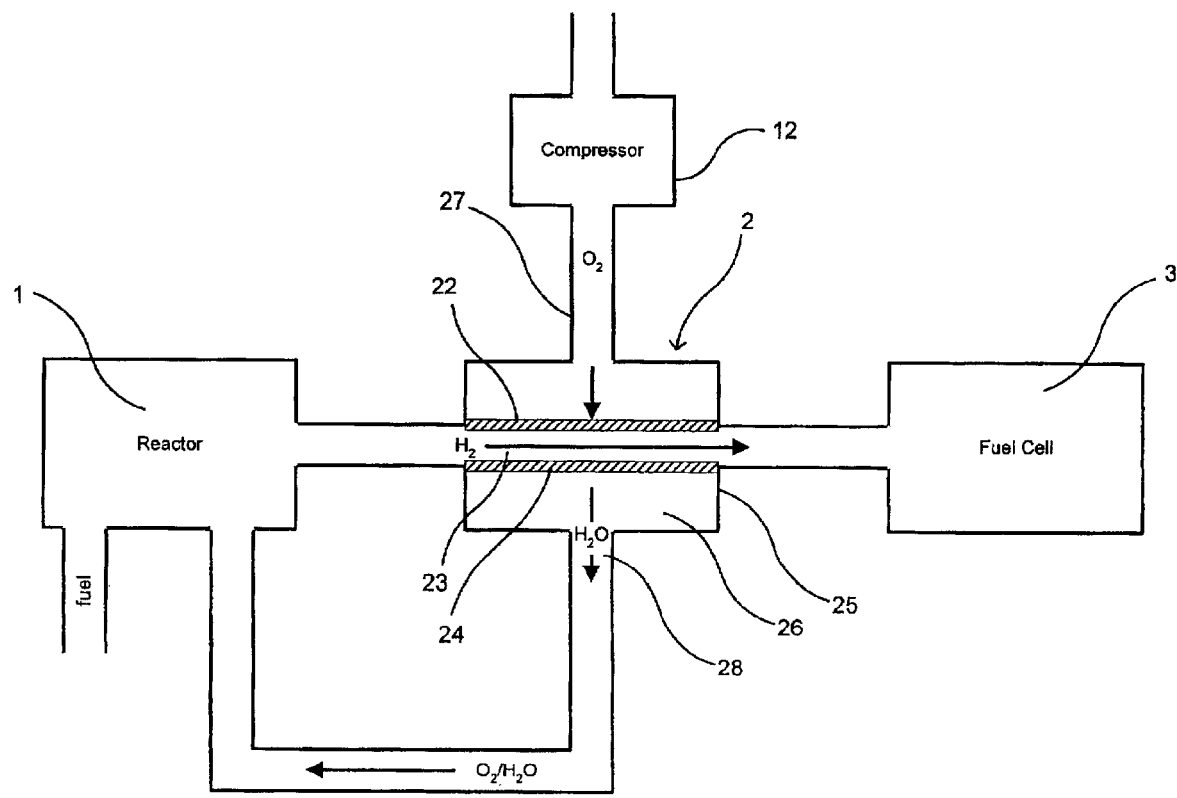
FIG. 4 is a diagram of a cross sectional view of a preferred embodiment of this invention, comprising a compressor for oxidant entering the reactor.

In an embodiment as depicted in a cross-sectional view in FIG. 4, the hydrogen gas flows from the reactor (1), through the void space (23) of the conduit (22) of the water transfer device (2). Air flows into the housing (25) of the water transfer device through an air inlet (27). The air flows through the void space (26) in the housing over the conduit and exits out an air outlet (28). As the hydrogen reformate passes through the conduit, water is transferred outward through the conduit walls (24), which comprise the water transfer membrane material. The dried hydrogen reformate then flows to the fuel cell (3). The air flowing over the outer surface of the conduit picks up the water vapor and flows to the reactor (1), where it provides water needed for the reformer reactions. Preferably, the air is heated as it passes over the conduit, thereby providing heat to the reactor and cooling the reformate. In other embodiments, the secondary gas comprises a gaseous hydrocarbon fuel (e.g., methane or a vaporized liquid fuel).

In an embodiment as depicted in FIG. 3, the reactor comprises the primary reactor (4), as well as the downstream reactors (5) and (6). In an alternative embodiment, the reactor comprises the primary reactor (4) and the water/gas shift reactor (5), and the reformate passing through the water transfer device flows to a PrOx reactor. The water vapor stream provided by the water transfer device (2) is preferably provided to the reactors that need water. In one embodiment, the stream is provided to the primary reactor (4) and the WGS reactor (5).

Preferably the pressure of the primary gas in the conduit is from about 50% to about 500%, more preferably from about 100% to about 300%, more preferably from about 170% to about 270%, of the pressure of the secondary gas in the housing. Also preferably, the temperature of the dry gas stream is less than or equal to the temperature of the wet gas stream. In a preferred embodiment, the dry gas stream is air, preferably at a temperature less than about 85° C. (185° F.), more preferably less than about 50° C. (122° C.), more preferably less than about 30° C. (86° F.). Preferably the dry gas stream is air at about ambient temperature and at about ambient pressure.

Preferably the temperature of the wet gas stream at the input of the water transfer device, is maintained at a temperature above the dew point of the gas, so that water does not condense in the water transfer device. Preferably the temperature of the wet gas stream at the inlet of the water transfer device is from about 1° C. (1.8° F.) to about 10° C. (18° F.), more preferably from about 1° C. (1.8° F.) to about 5° C. (9° F.), above its dew point.

Preferably, the water transfer efficiency of the water transfer device of this invention is at least about 30% preferably at least about 50%, more preferably at least about 80%, more preferably at least about 90%. As referred to herein, "water transfer efficiency" is the ratio of $dW_{act}/dW_{max}$, where $dW_{act}$ is the amount of water actually transferred from the dry gas stream to the wet gas stream, and $dW_{max}$ is the maximum amount of water that theoretically could have been transferred. The amount of water transferred may be determined using conventional measurements of water content of gaseous streams, known in the art. The maximum amount of water $dW_{max}$ is the lesser of the maximum amount of water that can be absorbed by the dry gas stream (at a given operating temperature and pressure), and the actual amount of water in the input wet gas stream.

A preferred fuel processor embodiment also comprises an air moving device, such as a compressor or blower, for supply of air to the reactor (e.g., the primary and WGS reactors). As depicted in FIGS. 2 and 4, the air-moving device in one embodiment is a compressor (12), which provides air under pressure to the reactor (1). In embodiments in which the water transfer device humidifies the air for the reactor, the water transfer device may humidify the air after it has been compressed (i.e., the device is connected to the output of the compressor) or, preferably, it may humidify the air before it is compressed (i.e., the device is connected to the input of the compressor).

The examples and other embodiments described herein are exemplary and not intended to be limiting in describing the full scope of apparatuses, devices, components, materials, compositions and methods of this invention. Equivalent changes, modifications and variations of specific embodiments, materials, compositions and methods may be made with substantially similar results.

What is claimed is:

1. A fuel processor for the production of hydrogen from a hydrocarbon fuel, comprising:
   (a) a reactor for the production of hydrogen-containing reformate using an oxidant, water and hydrocarbon fuel; and
   (b) a water transfer device that transfers water vapor from the reformate produced by said reactor to a reactant used by said reactor, comprising a water-transfer membrane.

2. A fuel processor according to claim 1, wherein said reactant is air.

3. A fuel processor according to claim 2, wherein said air is at a temperature less than about 50° C.

4. A fuel processor according to claim 3, wherein said air is at about ambient temperature.

5. A fuel processor according to claim 1, wherein said water transfer membrane comprises poly[perfluorosulfonic] acid.

6. A fuel processor for the production of hydrogen from a hydrocarbon fuel, comprising:
   (a) a reactor having a reactant input, and a reformate output; and
   (b) a water transfer device comprising (i) a transfer device input connected to said reformate output of the reactor, (ii) a transfer device output connected to said reactant input of the reactor, and (iii) a water-transfer membrane; wherein said water transfer device transfers water from said reformate output to said reactant input.

7. A power plant fuel processor according to claim 5, wherein said reactant input of the reactor is an oxidant input.

8. A power plant fuel processor according to claim 6, wherein said reactor is an autothermal reactor.

9. A power plant according to claim 6, further comprising a compressor having a reactant input and that supplies an output of compressed reactant to said reactant input of the reactor, wherein said water transfer device transfers water vapor to said reactant input of the compressor.

10. A power plant fuel processor according to claim 7, wherein said reactant input of the reactor is an oxidant input.

11. A power plant according to claim 8, wherein said water transfer device comprises an input for air at a temperature of less than about 50° C.

12. A power plant according to claim 11, wherein said water transfer device additionally comprises an input for air at about ambient temperature.

13. A power plant fuel processor according to claim 6, wherein said membrane comprises poly[perfluorosulfonic] acid.

14. A method for humidifying a reactant for a fuel processor that makes a hydrogen-containing reformate, comprising the transfer of water vapor from said reformate to said reactant using a water transfer device comprising a water transfer membrane.

15. A method for humidifying a reactant according to claim 14, wherein said reactant is air.

16. A method for humidifying a reactant according to claim 15, wherein said air is at a temperature of less than about 50° C. when it is humidified by said water transfer device.

17. A water transfer device for the transfer of water vapor from a primary gas to a secondary gas in a fuel cell power plant, having a primary gas inlet, a primary gas outlet, a secondary gas inlet and a secondary gas outlet, comprising:

(a) a primary gas inlet;

(b) a primary gas outlet;

(c) a secondary gas inlet;

(d) a secondary gas outlet;

(e) a conduit having an inner void and outer surface, the walls of which comprise a water transfer membrane material, wherein one end of said conduit is connected to said primary gas inlet, and the other end of said conduit is connected to said primary gas outlet so as to allow for the flow of a primary gas through said inner void; and (f) a housing which encloses and provides a void space around at least a portion of the outer surface of said conduit, wherein said housing has a secondary gas inlet and a secondary gas outlet allowing for the flow of a secondary gas through said void space; wherein secondary gas flowing through the void space of said housing passes over an outer surface of said conduit, but does not substantially mix with primary gas flowing through the inner void of said conduit.

18. A water transfer device according to claim 17, comprising a plurality of said conduits, all of which are connected to said primary gas inlet and said primary gas outlet.

19. A water transfer device according to claim 17, wherein said water transfer membrane material comprises a poly [perfluorosulfonic] acid.

20. A water transfer device according to claim 19, wherein the direction of said flow of primary gas is in essentially the opposite direction of the said flow of said secondary gas.

21. A method for humidifying a reactant for a fuel processor using a water transfer device according to claim 17.

22. A method for humidifying a reactant for a fuel processor according to claim 21, wherein said primary gas inlet is supplied with reformate produced by a reactor, and said secondary gas inlet is supplied with air, comprising transferring of water vapor from said reformate to said air using said water transfer device, and supplying said air from said secondary gas outlet to a reactor in said fuel processor.

23. A method for humidifying a reactant for a fuel processor according to claim 22, wherein the temperature of said air is less than about 50° C., and the pressure of said reformate is from about 170% to about 270% of the pressure of said air.

24. A fuel processor according to claim 1, wherein said water transfer device comprises:

(a) a reformate gas inlet connected to the reformate stream outlet of said reactor;

(b) a reformate gas outlet;

(c) an oxidant gas inlet;

(d) an oxidant gas outlet;

(e) a conduit having an inner void and an outer surface, the walls of which comprise a water transfer membrane material, wherein one end of said conduit is connected to said reformate gas inlet, and the other end of said conduit is connected to said reformate gas outlet so as to allow for the flow of hydrogen gas through said inner void; and (f) a housing which encloses and provides a void space around at least a portion of the outer surface of said conduit, wherein said housing has an oxidant gas inlet and an oxidant gas outlet allowing for the flow of an oxidant gas through said void space; wherein the oxidant gas flowing through said void space in the housing passes over said conduit, but does not substantially mix with the hydrogen gas flowing through said inner void of the conduit.

* * * * *